US008437114B2

(12) United States Patent
Yamamoto et al.

(10) Patent No.: US 8,437,114 B2
(45) Date of Patent: May 7, 2013

(54) ESD PROTECTION DEVICE

(75) Inventors: Issei Yamamoto, Ritto (JP); Jun Adachi, Koga (JP); Akihiko Kamada, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 94 days.

(21) Appl. No.: 13/112,059

(22) Filed: May 20, 2011

(65) Prior Publication Data

US 2011/0216456 A1 Sep. 8, 2011

Related U.S. Application Data

(63) Continuation of application No. PCT/JP2009/005563, filed on Oct. 22, 2009.

(30) Foreign Application Priority Data

Nov. 26, 2008 (JP) ................................ 2008-301660

(51) Int. Cl.
*H01C 7/12* (2006.01)
*H02H 3/22* (2006.01)

(52) U.S. Cl.
USPC .............. 361/126; 361/56; 361/119; 361/127

(58) Field of Classification Search .................... 361/56, 361/119, 126, 127, 111
See application file for complete search history.

(56) References Cited

U.S. PATENT DOCUMENTS

| | | | | |
|---|---|---|---|---|
| 5,694,284 | A * | 12/1997 | Oda et al. | 361/119 |
| 6,721,157 | B2 * | 4/2004 | Shin | 361/120 |
| 7,633,735 | B2 * | 12/2009 | Urakawa | 361/112 |
| 2007/0285866 | A1 * | 12/2007 | Ueda et al. | 361/120 |

FOREIGN PATENT DOCUMENTS

| | | | |
|---|---|---|---|
| EP | 2 061 123 | A1 | 5/2009 |
| JP | 08-017548 | A | 1/1996 |
| JP | 08-017550 | A | 1/1996 |
| JP | 08-138828 | A | 5/1996 |
| JP | 2000-277229 | A | 10/2000 |
| JP | 2001-043954 | A | 2/2001 |
| JP | 2003-059616 | A | 2/2003 |
| JP | 2004-014466 | A | 1/2004 |
| JP | 2005-276666 | A | 10/2005 |
| WO | 2008/146514 | A1 | 12/2008 |

OTHER PUBLICATIONS

Official Communication issued in corresponding Japanese Patent Application No. 2010-510574, mailed on Jan. 31, 2012.

(Continued)

*Primary Examiner* — Rexford Barnie
*Assistant Examiner* — Zeev V Kitov
(74) *Attorney, Agent, or Firm* — Keating & Bennett, LLP

(57) ABSTRACT

An ESD protection device is constructed such that its ESD characteristics are easily adjusted and stabilized and degradation of discharge characteristics caused by repetitive discharges is reliably prevented. The ESD protection device includes an insulating substrate, a cavity provided in the insulating substrate, at least a pair of discharge electrodes including exposed portions arranged to face each other and to be exposed in the cavity, external electrodes provided on a surface of the insulating substrate and connected to the discharge electrodes, and a conductive material dispersed along at least a portion of an inner circumferential surface which defines the cavity between the exposed portions of the discharge electrodes, the conductive material including an anchor portion embedded in the insulating substrate.

3 Claims, 8 Drawing Sheets

OTHER PUBLICATIONS

Official Communication issued in International Patent Application No. PCT/JP2009/005563, mailed on Jan. 12, 2010.
Adachi et al., "ESD Protection Device and Method for Manufacturing the Same," U.S. Appl. No. 13/113,111, filed May 23, 2011.
Adachi et al., "ESD Protection Device and Method for Manufacturing the Same," U.S. Appl. No. 13/115,221, filed May 25, 2011.
Adachi et al., "ESD Protection Device," U.S. Appl. No. 13/153,589, filed Jun. 6, 2011.

* cited by examiner

ESD PROTECTION DEVICE

BACKGROUND OF THE INVENTION

1. Field of the Invention

The present invention relates to an electrostatic discharge (ESD) protection device, and more particularly, to an ESD protection device having improved ESD characteristics and reliability that includes discharge electrodes disposed in a cavity of an insulating substrate and arranged to face each other.

2. Description of the Related Art

ESD is a phenomenon in which strong electrical discharge is generated when a charged conductive body (e.g., human body) comes into contact with or comes sufficiently close to another conductive body (e.g., an electronic device). ESD causes damage or malfunctioning of electronic devices. To prevent this, it is necessary to prevent an excessively high voltage generated during discharge from being transmitted to circuits of electronic devices. ESD protection devices, which are also called surge absorbers, are used for such an application.

An ESD protection device is disposed, for instance, between a signal line and a ground of the circuit. The ESD protection device includes a pair of discharge electrodes facing each other with a space provided therebetween. Therefore, the ESD protection device has high resistance under normal operation and a signal is not sent to the ground. An excessively high voltage, for example, generated by static electricity through an antenna of a mobile phone causes discharge between the discharge electrodes of the ESD protection device, which directs the static electricity to the ground. Thus, a voltage generated by static electricity is not applied to the circuits disposed downstream from the ESD protection device, which protects the circuits from the static electricity.

For example, an ESD protection device shown in an exploded perspective view of FIG. 11 and a sectional view of FIG. 12 includes a cavity 5 provided in a ceramic multilayer substrate 7 including a plurality of laminated insulating ceramic sheets 2. Discharge electrodes 6 facing each other and electrically connected to external electrodes 1 are disposed in the cavity 5 which contains discharge gas. When a breakdown voltage is applied between the discharge electrodes 6, discharge is generated between the discharge electrodes 6 in the cavity 5, which directs an excessive voltage to the ground. Consequently, the circuits disposed downstream from the ESD protection device are protected (e.g., refer to Japanese Unexamined Patent Application Publication No. 2001-43954).

However, in such an ESD protection device, the responsivity to ESD varies due to variations in the space between the discharge electrodes. Furthermore, although the responsivity to ESD needs to be adjusted using an area of the region sandwiched between discharge electrodes facing each other, the amount of adjustment is limited by the size of a product or other factors. Therefore, it is often difficult to achieve desired responsivity to ESD.

Thus, the discharge phenomenon may be efficiently generated by a structure in which a conductive material is dispersed between discharge electrodes as in a Comparative Example described later. However, in such a structure, the conductive material is scattered due to the shock during discharge and, thus, the distribution density is decreased. This gradually increases discharge voltage after every discharge, and the discharge characteristics are degraded because of the repetitive discharges.

SUMMARY OF THE INVENTION

To overcome the problems described above, preferred embodiments of the present invention provide an ESD protection device whose ESD characteristics are easily adjusted and stabilized and that prevents the degradation of discharge characteristics caused by repetitive discharges.

An ESD protection device according to a preferred embodiment of the present invention preferably includes an insulating substrate, a cavity provided in the insulating substrate, at least a pair of discharge electrodes including exposed portions that face each other and that are exposed in the cavity, external electrodes provided on a surface of the insulating substrate and connected to the discharge electrodes, and a conductive material dispersed along at least a portion of an inner circumferential surface which defines the cavity between the exposed portions of the discharge electrodes, the conductive material including an anchor portion embedded in the insulating substrate.

In the above-described structure, since the conductive material having conductivity is dispersed between the exposed portions of the discharge electrodes facing each other, electrons easily move in the cavity and, thus, a discharge phenomenon can be generated more efficiently. Therefore, the variation in the responsivity to ESD caused by the variation in the space between the discharge electrodes is decreased.

By adjusting the amount and particle size, for example, of the conductive material dispersed in the cavity, desired ESD characteristics (e.g., discharge starting voltage) can be easily achieved.

Accordingly, ESD characteristics can be adjusted and stabilized.

The conductive material is preferably firmly fixed in the insulating substrate via an anchor portion that is embedded in the substrate body. Therefore, the conductive material is prevented from being detached from the surface of the insulating substrate, which effectively prevents the degradation (e.g., an increase in discharge starting voltage) of ESD characteristics caused by repetitive discharges.

The conductive material is preferably coated with an insulating material.

In this case, since the conductive material is coated with an insulating material, an insulating property between pieces of the conductive material is improved, which prevents short circuits from occurring between the discharge electrodes.

The conductive material is preferably dispersed in a semiconductor material.

In this case, since a semiconductor material that is closer to an insulator than the conductive material is disposed between pieces of the conductive material, an insulating property between pieces of the conductive material is improved, which prevents short circuits from occurring between the discharge electrodes.

According to various preferred embodiments of the present invention, the ESD characteristics of an ESD device can be easily adjusted and stabilized, and the degradation of discharge characteristics caused by repetitive discharges is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to FIGS. 1A to 8B.

Figure 1A:
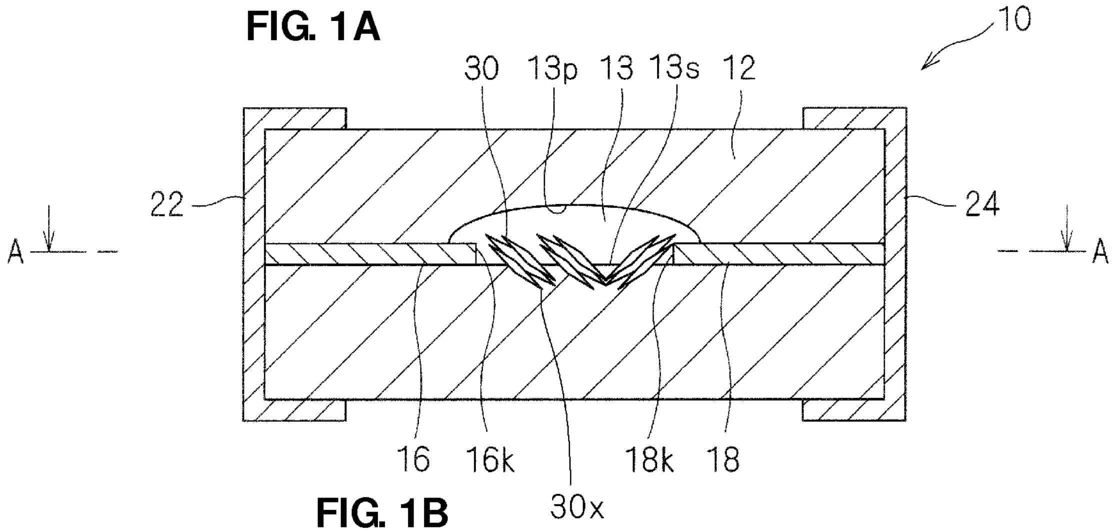
FIG. 1A is a sectional view of an ESD protection device and FIG. 1B is an enlarged sectional view of a principal portion of the ESD protection device according to a preferred embodiment of the present invention.
Figure 1B:
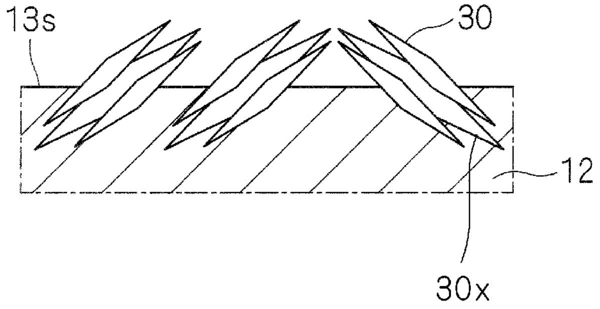
Figure 2:
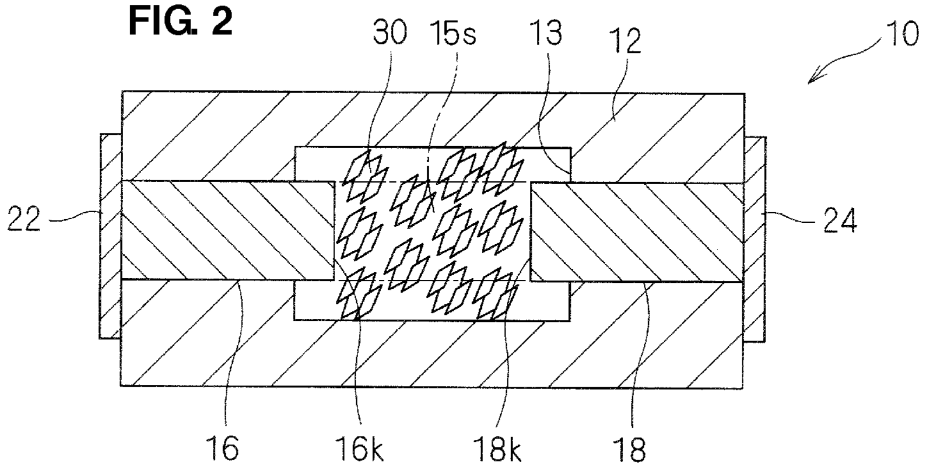
FIG. 2 is a sectional view taken along line A-A of FIG. 1A.

An ESD protection device 10 according to a first preferred embodiment of the present invention will be described with reference to FIGS. 1A, 1B and 2. FIG. 1A is a sectional view of the ESD protection device 10. FIG. 1B is a sectional view of a principal portion of a cavity 13 included in the ESD protection device 10. FIG. 2 is a sectional view taken along line A-A of FIG. 1A.

As shown in FIGS. 1A, 1B and 2, the ESD protection device 10 preferably includes a cavity 13 provided in a substrate body 12 of a ceramic multilayer substrate. A pair of discharge electrodes 16 and 18 are arranged such that respective edges 16*k* and 18*k* are exposed in the cavity 13. The edges 16*k* and 18*k* of the discharge electrodes 16 and 18 are arranged so as to face each other with a space provided therebetween. The discharge electrodes 16 and 18 preferably extend to the outer circumferential surface of the substrate body 12 and are respectively connected to external electrodes 22 and 24 provided on the surface of the substrate body 12. The external electrodes 22 and 24 are used for mounting the ESD protection device 10 on a substrate.

As schematically shown in FIGS. 1A and 1B, a conductive material 30 preferably including a pointed portion, that is, an anchor portion 30*x*, is dispersed in the cavity 13. In the conductive material 30, the pointed portion 30*x* is preferably embedded in the substrate body 12 through a bottom surface 13*s* of the cavity 13. A portion of the conductive material 30 is buried in the substrate body 12 and the other portion is exposed in the cavity 13. Since the conductive material 30 is preferably powder and is dispersed, the region (hereinafter may be referred to as a "supporting electrode") in which the conductive material 30 is provided has an insulating property.

In the ESD protection device 10, when a voltage equal to or greater than a certain voltage is applied between the external electrodes 22 and 24, discharge is generated in the cavity between the discharge electrodes 16 and 18 facing each other. Since the conductive material 30 is dispersed along the bottom surface 13*s* of the cavity 13, electrons easily move and, thus, discharge is generated more efficiently.

In other words, the discharge phenomenon between the discharge electrodes 16 and 18 is primarily a creeping discharge that is generated along the interface between the cavity 13, which is in a gaseous phase, and the substrate body 12, which is an insulator (that is, the inner circumferential surface including a top surface 13*p* and the bottom surface 13*s* that define the cavity 13). Creeping discharge is a discharge phenomenon in which current flows along a surface of a material (insulator). Although it has been described that electrons flow, it is believed that, in reality, the electrons move by hopping along the surface, thus ionizing the gas. It is also believed that the presence of conductive powder on the surface of an insulator decreases the apparent distance which the electrons hop and imparts directionality to the electrons, thereby generating more active creeping discharge. Since the conductive material 30 is preferably dispersed along the bottom surface 13*s* of the cavity 13 such that the distance between the discharge electrodes 16 and 18 is minimized, creeping discharge is easily generated on the bottom surface 13*s*.

If discharge phenomenon is efficiently generated between the discharge electrodes 16 and 18, the space between the discharge electrodes 16 and 18 is effectively decreased. The variation in the responsivity to ESD caused by the variation in the space between the discharge electrodes 16 and 18 is also decreased. Thus, stable responsivity to ESD is effectively achieved.

The pointed portion 30*x* of the conductive material 30 is preferably buried in the substrate body 12. Therefore, the conductive material 30 is firmly fixed to the substrate body 12 and is not easily detached from the substrate body 12 due to the shock caused during discharge as compared to the case in which a spherical conductive material is buried as in Comparative Example 1 described later. Thus, ESD discharge characteristics are not easily degraded after repetitive discharges.

A method for manufacturing the ESD protection device 10 will now be described.

First, materials for forming a substrate body 12, discharge electrodes 16 and 18, and a conductive material 30 of a supporting electrode are produced.

A ceramic green sheet for forming the substrate body 12 is produced as follows.

1. A material primarily including Ba, Al, and Si (BAS material) is preferably used as a ceramic material. Raw materials are prepared and mixed so that the mixture has a desired composition. The mixture is then calcined at about 800° C. to about 1000° C., for example.

2. The calcined powder obtained through the process 1 is pulverized using a zirconia ball mill for about 12 hours to obtain ceramic powder.

3. The ceramic powder obtained through the process 2 is mixed with an organic solvent, such as toluene or ethanol, for example. The mixture is further mixed with a binder and a plasticizer to obtain slurry.

4. The obtained slurry is formed into a ceramic green sheet preferably having a thickness of about 50 μm by a doctor blade method, for example.

The ceramic material is not particularly limited to the material described above as long as the ceramic material has an insulating property. Therefore, such a ceramic material may be a mixture of forsterite and glass, a mixture of $CaZrO_3$ and glass, or other suitable ceramic material, for example.

Charged powder (i.e., charged particles including metals) used for forming the conductive material 30 of a supporting electrode is produced as follows.

1. A solution obtained by dissolving a non-aqueous acrylic resin in methyl ethyl ketone is preferably prepared.

2. Cu powder preferably having a flake shape with an average particle size of about 10 μm, NaOH, and IPA are added to the solution prepared through the process 1 and the solution is stirred.

3. Water is added dropwise to the solution prepared through the process 2 to cause phase inversion. As a result, capsule copper powder coated with the acrylic resin is obtained.

4. The solution prepared through the process 3 is left to stand to precipitate the capsule copper powder.

5. The supernatant of the solution is removed and powder including only a resin is removed by washing with water. Only the capsule copper powder is preferably dried using a vacuum drying oven.

6. The composite powder obtained through the process 5 is preferably mixed with a surface additive (silica powder), and the surface additive is uniformly attached to the surface of the composite powder using a surface treatment apparatus.

7. The composite powder (toner) obtained through the process 6 is mixed with a carrier to produce a developer.

The conductive material of the toner preferably includes at least one metal selected from the group of transition metals such as Cu, Ni, Co, Ag, Pd, Rh, Ru, Au, Pt, and Ir, for example. These metals can be used alone or in combination in an alloy. An oxide of these metals may also be used.

The average particle size of the conductive material of the toner is preferably about 0.5 μm to about 30 μm, and more preferably about 1 μm to about 20 μm, for example. When the average particle size is about 20 μm or less, short circuits are not easily established between the discharge electrodes. When the average particle size is about 1 μm or more, the conductive material is not easily aggregated when coated with a resin. Consequently, a toner having good electrostatic properties is provided.

The average particle size of the toner is preferably about 0.5 μm to about 40 μm, and more preferably about 1 μm to about 25 μm, for example. When the average particle size is about 25 μm or less, short circuits are not easily established between the discharge electrodes. When the average particle size is about 1 μm or more, the toner is not easily aggregated when subjected to the addition of the surface additive. Consequently, a toner having good electrostatic properties is provided.

The content of the conductive material is preferably about 10 wt % to about 95 wt %, and more preferably about 30 wt % to about 70 wt %, for example. When the content is about 95 wt % or less, the electrostatic property is not degraded by the amount of a resin included in the toner and, thus, the conductive material is not exposed. When the content is about 10 wt % or more, the density of the conductive material in the supporting electrode is increased, which sufficiently facilitates discharge.

The toner-coating resin is preferably a non-aqueous material that is eliminated through combustion, decomposition, fusion, or vaporization when fired and in which the surface of the conductive powder is exposed. Examples of the toner-coating resin that may be used include styrene resins, (meth) acrylic resins, polyester resins, polyurethane resins, epoxy resins, and styrene-(meth)acrylic resins.

The shape of particles of the conductive powder is not particularly limited as long as particles of the conductive powder include a pointed portion. The particles of conductive powder may preferably have a plate shape, a polygonal shape, or a crenated shape, for example, instead of a flake shape.

Powder obtained by coating the surface of a metal with an inorganic material, such as $Al_2O_3$, $ZrO_2$, or $SiO_2$, for example, may be used as a raw material. In this case, even if the toner is not sufficiently coated with a resin, good electrostatic properties are maintained because of the insulating property of the inorganic material that coats the metal. Furthermore, since, even after firing, the toner is coated with the inorganic material and the surface of the metal is not exposed, short circuits do not occur even if particles of powder contact each other.

The method for producing the toner is not limited to phase-inversion emulsification, and publicly known methods such as a mechanical coating method, a kneading-grinding method, and a wet polymerization method, for example, may be used.

An electrode paste used when discharge electrodes 16 and 18 are formed by screen printing is produced as follows.

1. A solvent is added to about 80 wt % Cu powder having an average particle size of about 2 μm and a binder resin composed of ethyl cellulose or other suitable resin.

2. The sample obtained through the process 1 is stirred and mixed using a roll to obtain an electrode paste.

The conductive material of the electrode paste preferably includes at least one metal selected from the group of transition metals such as Cu, Ni, Co, Ag, Pd, Rh, Ru, Au, Pt, and Ir, for example. These metals can be used alone or in combination in an alloy. An oxide of these metals may also be used.

A resin paste for forming a cavity 13 is produced as follows.

1. A solvent is added to resin powder having an average particle size of about 2 μm.

2. The sample obtained through the process 1 is stirred and mixed using a roll to obtain a resin paste.

The resin material is preferably at least one resin selected from resins that are eliminated through combustion, such as acrylic reins, styrene-acrylic resins, polyolefin resins, polyester resins, polypropylene resins, and butyral resins and resins that are decomposed into monomers at high temperature, for example. These resins can be used alone or in combination.

The toner is transferred to the ceramic green sheet by xerography to produce a ceramic green sheet having a supporting electrode formed thereon as follows.

1. A photoconductor is uniformly charged.

2. The charged photoconductor is irradiated with light using an LED in a pattern of a supporting electrode to form a latent image. In a manufacturing example, the supporting electrode pattern was set to about 30 μm×about 100 μm, which was the same size as that of a gap between the discharge electrodes.

3. The toner is developed on the photoconductor by applying a developing bias.

4. A ceramic green sheet is placed on the photoconductor on which the supporting electrode pattern has been developed to transfer the toner to the ceramic green sheet.

5. The ceramic green sheet to which the supporting electrode pattern has been transferred is inserted between PET films and pressed. Thus, the toner is buried and fixed in the ceramic green sheet and a ceramic green sheet on which the supporting electrode has been formed is produced. In this manufacturing example, the pressing pressure was set to about 100 tons.

In this manufacturing example, the size of the supporting electrode pattern was set to the same size as that of the gap between the discharge electrodes. However, the size may preferably be increased by about 10 μm to about 50 μm in view of printing displacement. Alternatively, the size of the discharge electrode pattern may preferably be increased by about 10 μm to 50 about μm with respect to the supporting electrode pattern.

By changing the pressing pressure, the amount of toner buried into the green sheet may be adjusted. If the pressing pressure is relatively high and, thus, the amount of toner buried is large, the toner is not easily scattered due to the shock during discharge. If the pressing pressure is relatively low and, thus, the amount of toner buried is small, the surface area of the conductive powder exposed is increased, which improves discharge characteristics.

In this manufacturing example, the supporting electrode was formed by xerography. However, publicly known methods such as screen printing, ink jet printing, thermal transfer printing, gravure printing, and direct-writing printing, for example, may be used.

For the ceramic green sheet having the supporting electrode formed thereon, a discharge electrode pattern is then formed on a surface on which the supporting electrode has been formed, using the electrode paste by screen printing. In this manufacturing example, the discharge electrode pattern was formed such that the width of the discharge electrodes was about 100 μm and the discharge gap (the distance between the edges of the discharge electrodes facing each other) was about 30 μm.

The discharge electrode pattern was formed preferably by screen printing. However, publicly known wiring pattern-formation methods such as xerography, ink jet printing, thermal transfer printing, gravure printing, and direct-writing printing, for example, may be suitably used.

For the ceramic green sheet having the supporting electrode and the discharge electrodes formed thereon, a cavity pattern is then formed on a surface on which the supporting electrode and the discharge electrodes have been formed, using the resin paste by screen printing.

In this manufacturing example, the cavity pattern was formed by screen printing. However, publicly known wiring pattern-formation methods such as xerography, ink jet printing, thermal transfer printing, gravure printing, and direct-writing printing, for example, may be suitably used.

In this manufacturing example, the resin paste was preferably used to form the cavity. However, a material, such as carbon, for example, that is eliminated when fired may be used instead of such a resin.

The cavity is not necessarily formed by printing, and may be disposed by simply attaching a resin film or the like to a certain position.

The ceramic green sheets are then laminated and fired as follows.

1. An electrode pattern is formed on layers on which the electrode pattern is supposed to be formed.

2. All the layers are laminated and press-bonded.

3. The laminated body is cut into chips using a mold in the same manner as chip-type components such as LC filters. In this manufacturing example, the laminated body was cut so that each of the chips has a size of about 1.0 mm×about 0.5 mm.

4. The conductive paste is applied to end surfaces to form external electrodes.

5. Firing is performed in a $N_2$ atmosphere. If a rare gas such as Ar or Ne is introduced into the cavity to decrease the response voltage to ESD during firing, the chip can be fired in an atmosphere of the rare gas such as Ar or Ne in a temperature range in which a ceramic material is shrunk and sintered. If the electrode material (e.g., Ag) is not oxidized, the firing may be performed in the air.

6. Ni plating and Sn plating are performed on the external electrodes to complete an ESD protection device.

The resin paste is eliminated through firing and a cavity is formed in the chip. The resin included in the supporting electrode is also eliminated through firing, and the conductive material remaining in the cavity forms a supporting electrode. The conductive material 30 has a pointed portion 30*x*. The pointed portion 30*x* functions as an anchor portion that is embedded in the ceramic substrate, and the conductive material is firmly fixed to the ceramic substrate. Thus, the conductive material 30 is not easily scattered due to the shock during discharge.

The conductive material is not limited to the above-described metal material, and a resistive material or a semiconductor material having low conductivity may also be used.

An ESD protection device 10*x* of Comparative Example 1 will now be described with reference to FIGS. 9 and 10.

Figure 9:
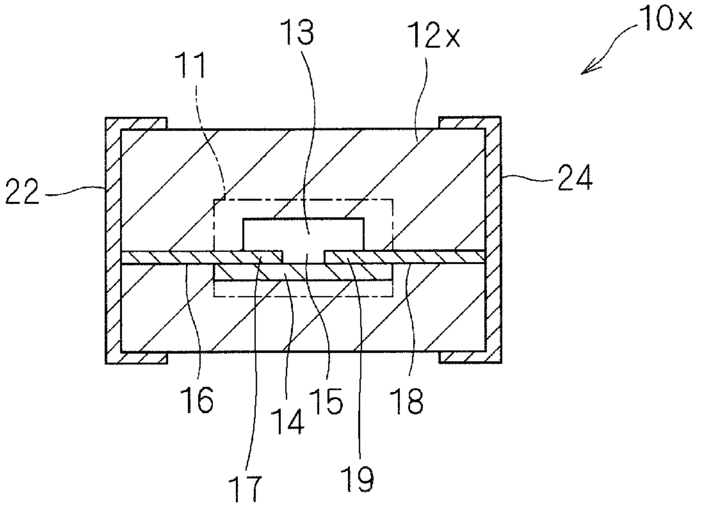
FIG. 9 is a sectional view of an ESD protection device according to the Comparative Example 1.
Figure 10:
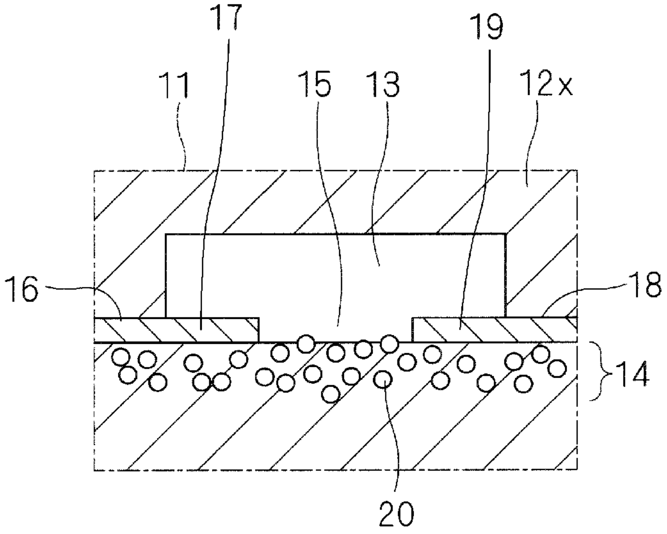
FIG. 10 is an enlarged sectional view of a principal portion of the ESD protection device according to the Comparative Example 1.
Figure 11:
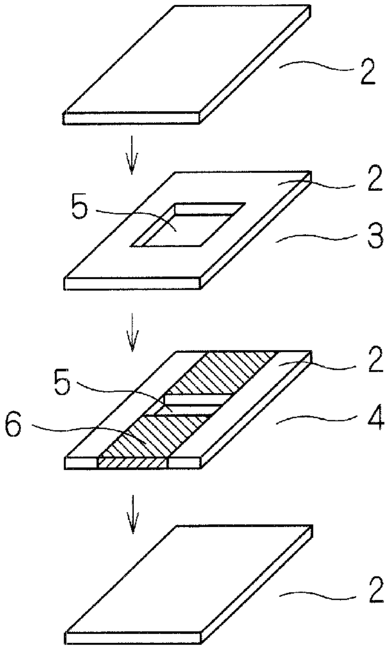
FIG. 11 PRIOR ART
FIG. 11 is an exploded perspective view of a conventional ESD protection device.
Figure 12:
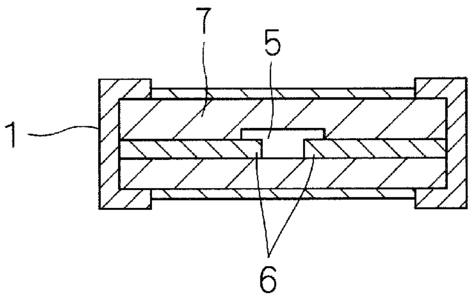
FIG. 12 PRIOR ART
FIG. 12 is a sectional view of the conventional ESD protection device shown in FIG. 11.

FIG. 9 is a sectional view of the ESD protection device 10*x*. FIG. 10 is an enlarged sectional view of a principal portion schematically showing a region 11 indicated by a chain line of FIG. 9.

As shown in FIG. 9, the ESD protection device 10*x* includes a cavity 13 provided in a substrate body 12 of a ceramic multilayer substrate such that portions 17 and 19 of discharge electrodes 16 and 18 are exposed in the cavity 13. The discharge electrodes 16 and 18 are respectively connected to external electrodes 22 and 24 provided on a surface of the substrate body 12.

In the ESD protection device 10*x*, a supporting electrode 14 is arranged so as to be adjacent to a region 15 between the discharge electrodes 16 and 18. As shown in FIG. 10, the supporting electrode 14 is a region in which a conductive material 20 is dispersed in an insulating material defining the substrate body 12 and has an insulating property. A portion of the conductive material 20 is exposed in the cavity 13. The supporting electrode 14 is formed by applying a paste for the supporting electrodes that includes, for example, a ceramic material and a conductive material to a ceramic green sheet.

In the ESD protection device 10*x*, a portion of the conductive material 20 included in the supporting electrode 14 is scattered due to the shock during discharge and thus the distribution density of the conductive material 20 is likely to be decreased. This gradually increases the discharge voltage through repetitive discharges, and the ESD discharge characteristics are likely to be degraded.

Figure 3:
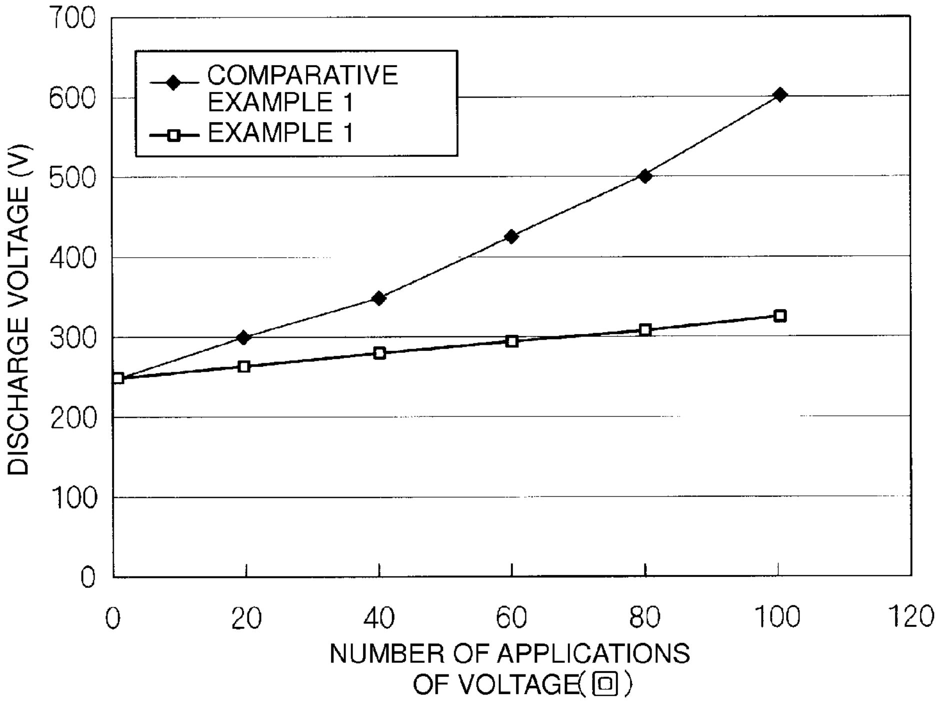
FIG. 3 is a graph showing discharge characteristics of ESD protection devices according to a preferred embodiment of the present invention and according to a Comparative Example 1.

The ESD protection device of Comparative Example 1 whose conductive material 20 is substantially spherical and the ESD protection device of the first preferred embodiment whose conductive material 30 includes a pointed portion 30*x* were manufactured. The discharge voltages when a voltage of about 8 kV was repeatedly applied were measured using 100 samples for each of the ESD protection devices. FIG. 3 is a graph showing the measurement results.

It is clear from FIG. 3 that the ESD characteristics after repetitive discharges is prevented from being degraded in the structure in which the conductive material 30 includes a pointed portion 30*x* as in the first preferred embodiment as compared to the structure in which the conductive material 20 is substantially spherical as in Comparative Example 1.

It is also understood that the discharge voltage in the first preferred embodiment is less than that in Comparative Example 1 and, thus, the ESD discharge characteristics are further improved in the first preferred embodiment as compared to Comparative Example 1.

The width of a region in which the conductive material 30 is disposed may be greater than, equal to, or less than the width of the discharge electrodes 16 and 18. In other words, the conductive material 30 may be disposed inside and outside of the region 15*s* as shown in FIG. 2; the conductive material 30 may be disposed in the entire region 15*s* that is indicated by a chain line and is sandwiched between the edges 16*k* and 18*k* of the discharge electrodes 16 and 18 facing each other; and the conductive material 30 may be disposed in a portion of the region 15*s*.

An ESD protection device 10*a* according to a second preferred embodiment of the present invention will be described with reference to FIGS. 4A and 4B.

The ESD protection device 10*a* of the second preferred embodiment preferably has substantially the same structure as that of the ESD protection device 10 of first preferred embodiment. Hereinafter, the same elements and components as those in first preferred embodiment are designated by the same reference numerals, and the different points between the first and second preferred embodiments will be primarily described.

Figure 4A:
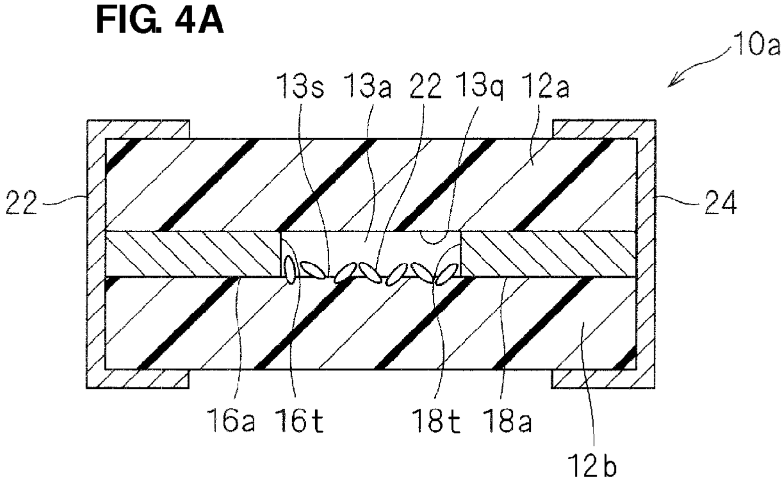
FIG. 4A is a sectional view of an ESD protection device and FIG. 4B is an enlarged sectional view of a principal portion of the ESD protection device according to another preferred embodiment of the present invention.
Figure 4B:
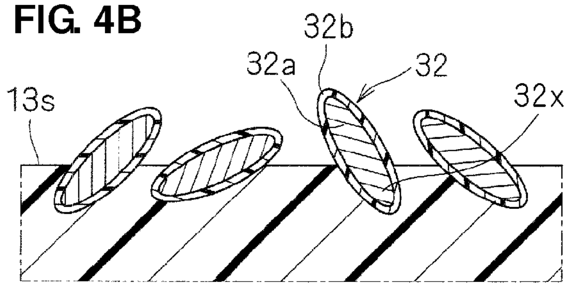

FIG. 4A is a sectional view of the ESD protection device 10*a*. FIG. 4B is an enlarged sectional view of a principal portion of a cavity 13*a*. As schematically shown in FIGS. 4A and 4B, the ESD protection device 10*a* of the second preferred embodiment differs from the ESD protection device 10 of first preferred embodiment in that substrate bodies 12*a* and 12*b* are preferably resin substrates, supporting electrode grains 32 defining a supporting electrode are preferably toner particles each obtained by coating a conductive material 32*a* with a resin material 32*b*, and the height of a top surface 13*q* of the cavity 13*a* is preferably substantially equal to the thickness of discharge electrodes 16 and 18.

A method for manufacturing the ESD protection device 10*a* of the second preferred embodiment will be described.

First, materials for forming a substrate body 12, discharge electrodes 16 and 18, and a conductive material 32*b* of a supporting electrode are produced.

Charged powder (i.e., charged particles including metals for forming the supporting electrode grains 32) used for forming the conductive material 32*a* of a supporting electrode is produced as follows.

1. Cu powder having a substantial plate shape and an average particle size of about 2.5 μm is mixed with an acrylic resin and the surface of the copper powder is coated with the resin using a surface treatment apparatus.

2. The sample obtained through the process 1 is classified using a classifier to remove fine powder and coarse powder.

3. The composite powder obtained through the process 2 by coating the surface of the copper powder with the acrylic resin is dispersed in an aqueous solution including a dispersant dissolved therein. After the composite powder is precipitated, the supernatant of the solution is removed and the composite powder is dried using a vacuum drying oven.

4. The composite powder obtained through the process 3 is mixed with a surface additive (silica powder), and the surface additive is uniformly attached to the surface of the composite powder using a surface treatment apparatus.

5. The composite powder obtained through the process 4 is mixed with a carrier to produce a developer.

The toner-coating resin is preferably a resin that has good electrostatic properties and is eliminated through combustion, decomposition, fusion, or vaporization when fired so that the surface of the conductive powder is exposed. Examples of the resin include acrylic reins, styrene-acrylic resins, polyolefin resins, polyester resins, polypropylene resins, and butyral resins. However, the resin is not necessarily completely eliminated. There is no problem if the resin with a thickness of about 10 nm remains.

Powder obtained by coating the surface of a metal with an inorganic material, such as $Al_2O_3$, $ZrO_2$, or $SiO_2$, for example, may be used as a raw material. In this case, even if the toner is not sufficiently coated with a resin provided for imparting an insulating property, good electrostatic properties can still be maintained.

A static control agent may preferably be added to the toner. Examples of a positive charge control agent include nigrosine bases and the derivatives thereof, quaternary ammonium salts, naphthenic acid or higher fatty acid salts, alkoxylated amine alkylamides, triphenylmethane dyes, oligomers and polymers having a positive charge control agent in the side chain thereof, quaternary pyridinium, and metal salts of higher fatty acids. Examples of a negative charge control agent include azo complex dyes containing a metal (Cr or Fe) and chromium, zinc, aluminum, and boron complexes of salicylic acid or the derivatives thereof.

Cu foil is preferably laminated on a prepreg and discharge electrodes 16*a* and 18*a* are patterned by photolithography to form a substrate A that later becomes one resin substrate 12*a*. In this manufacturing example, the substrate A was formed such that the width of the discharge electrodes was about 200 μm and the discharge gap was about 40 μm.

A substrate B that later becomes another resin substrate 12*b* is formed as follows.

1. A photoconductor is uniformly charged.

2. The charged photoconductor is irradiated with light using an LED in a pattern of a supporting electrode to form a latent image. In this manufacturing example, the supporting electrode pattern was set to about 50 μm×about 220 μm, which was larger in size than a gap between the discharge electrodes in consideration of position displacement.

3. The toner is developed on the photoconductor by applying a developing bias.

4. An intermediate transfer film having a surface roughness Ra of about 5 μm is placed on the photoconductor on which the supporting electrode pattern has been developed to transfer the toner to the intermediate transfer film.

5. The intermediate transfer film on which the supporting electrode pattern has been transferred is placed on the prepreg and they are pressed. As a result, the toner is buried and fixed in the prepreg and, thus, a substrate B having the supporting electrode pattern formed thereon is produced. The pressing pressure was set to about 30 tons.

If the surface roughness of the intermediate transfer film is relatively low, the toner having a substantial plate shape lies down and does not stick to the prepreg. To make the toner having a substantial plate shape stick to the prepreg, the range of the surface roughness Ra is preferably about 0.5 to about 10 times the toner particle size (the size in the longitudinal direction).

The substrate A (completely cured body) is disposed on the substrate B (partially cured body) and bonded to each other by completely curing the substrate B. A cavity 13*a* is formed between edges 16*t* and 18*t* of the discharge electrodes 16*a* and 18*a*, the cavity 13*a* having a height that is preferably equal or substantially equal to the thickness of the Cu foil of the substrate A. The supporting electrode grains 32 obtained by coating the conductive material 32*a* with the resin material 32*b* are disposed in the cavity 13*a*.

Alternatively, after the substrate B is completely cured, the substrate A and the substrate B may be bonded to each other with an adhesive.

A baked electrode or a conductive resin electrode is formed on the end surfaces of the bonded substrate. Plating is then performed on the substrate to obtain external electrodes.

Through the steps described above, the ESD protection device 10*a* according to the second preferred embodiment is produced.

In the ESD protection device 10*a* of the second preferred embodiment, the conductive material 32*a* of the conductive powder having a substantial plate shape and coated with the resin 32*b* includes a pointed portion 32*x* that is embedded and buried in the resin substrate 12*b*. Therefore, the conductive material 32*a* is not easily scattered due to the shock during discharge as in Example 1.

Figure 5A:
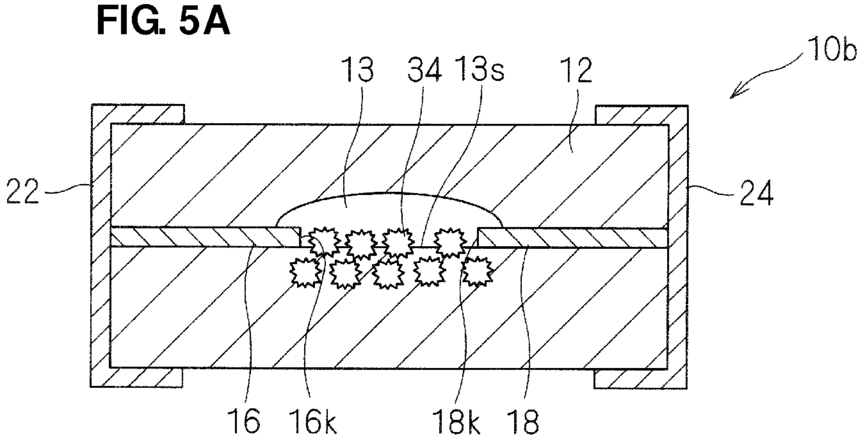
FIG. 5A is a sectional view of an ESD protection device and FIG. 5B is an enlarged sectional view of a principal portion of the ESD protection device according to another preferred embodiment of the present invention.
Figure 5B:
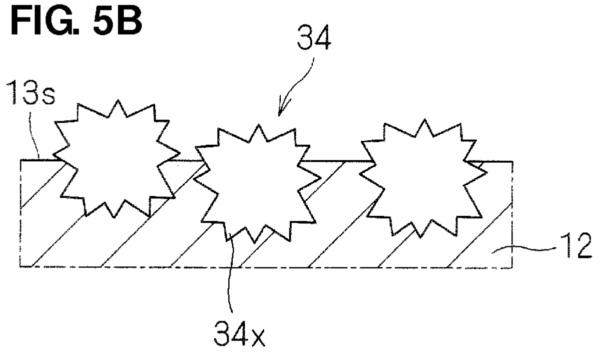

In an ESD protection device 10*b* according to another preferred embodiment of the present invention shown in a sectional view of FIG. 5A and an enlarged sectional view of a principal portion of FIG. 5B, a conductive material 34 dispersed between discharge electrodes 16 and 18 preferably has a crenated shape. The conductive material 34 includes a substantially spherical main body and many horn-shaped pointed portions 34*x* that protrude from the outer circumferential surface of the main body. As shown in FIG. 5B, the pointed portions 34*x* are embedded in the substrate body as anchor portions.

Figure 6A:
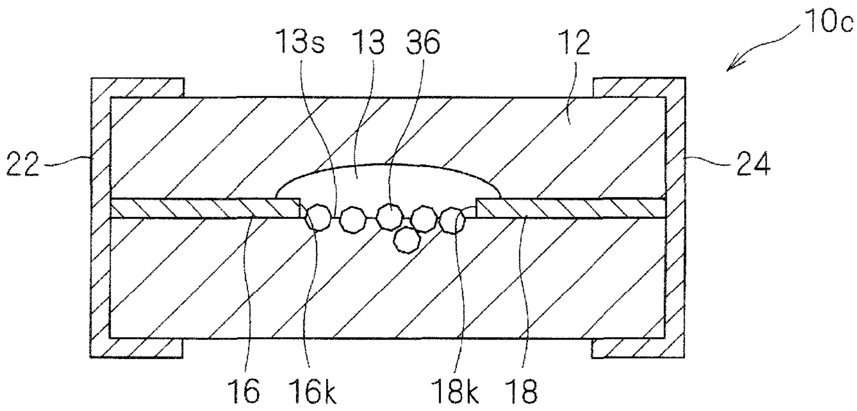
FIG. 6A is a sectional view of an ESD protection device and FIG. 6B is an enlarged sectional view of a principal portion of the ESD protection device according to another preferred embodiment of the present invention.
Figure 6B:
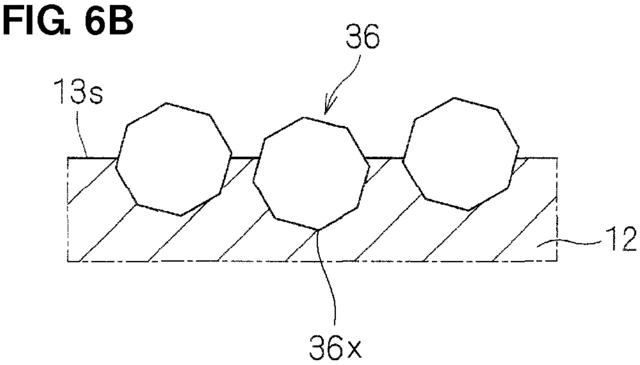

In an ESD protection device 10*c* according to another preferred embodiment of the present invention shown in a sectional view of FIG. 6A and an enlarged sectional view of a principal portion of FIG. 6B, a conductive material 36 dispersed between discharge electrodes 16 and 18 preferably has a polygonal cross-section and corners 36*x* are provided on the surface. As shown in FIG. 6B, the corners 36*x* are embedded in the substrate body as anchor portions.

Figure 7:
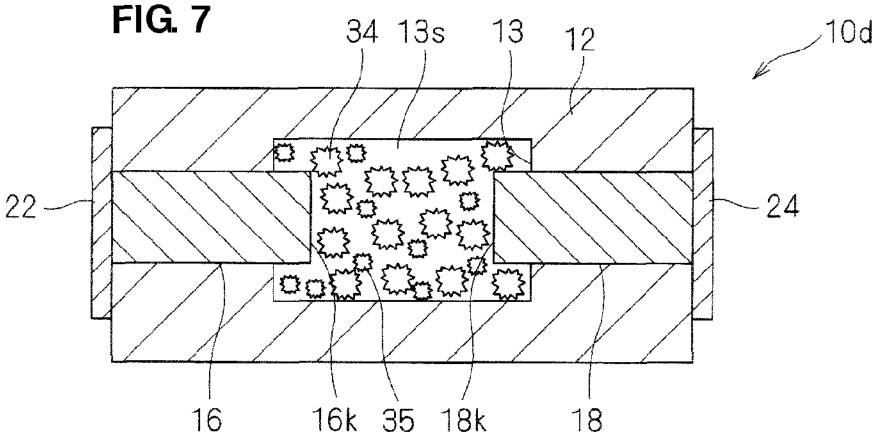
FIG. 7 is a sectional view of an ESD protection device according to another preferred embodiment of the present invention.

In an ESD protection device 10*d* according to another preferred embodiment of the present invention shown in a sectional view of FIG. 7, different types of conductive materials 34 and 35 having different sizes are preferably dispersed between discharge electrodes 16 and 18.

Figure 8A:
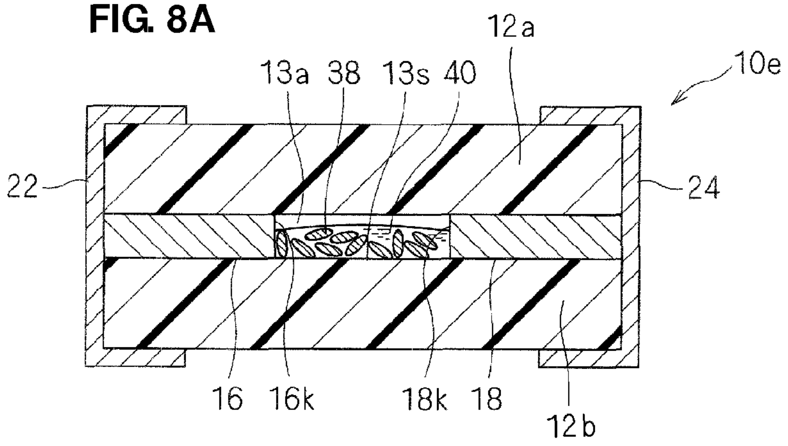
FIG. 8A is a sectional view of an ESD protection device and FIG. 8B is an enlarged sectional view of a principal portion of the ESD protection device according to another preferred embodiment of the present invention.
Figure 8B:
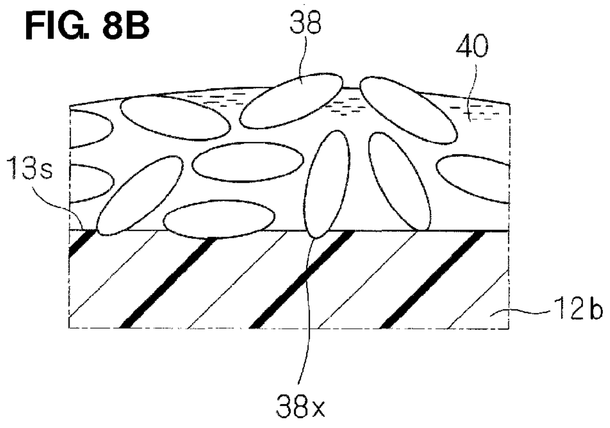

In an ESD protection device 10*e* according to another preferred embodiment of the present invention shown in a sectional view of FIG. 8A and an enlarged sectional view of a principal portion of FIG. 8B, a cavity 13*a* defined by the resin substrates 12*a* and 12*b* is preferably filled with a silicone solution 40, for example. A conductive material 38 having a substantial plate shape is dispersed in the silicone solution 40. The pointed portion 38*x* of the conductive material 38 are embedded in the resin substrate 12*b*.

As described above, ESD characteristics can be easily adjusted and stabilized by using conductive materials dispersed between the discharge electrodes. In a structure in which the conductive material includes an anchor portion that is embedded in the substrate body, the conductive material is not easily detached from the substrate body due to the shock that occurs during discharge. Therefore, the degradation of discharge characteristics caused by repetitive discharges is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ESD protection device comprising:

an insulating substrate;

a cavity provided in the insulating substrate;

at least one pair of discharge electrodes including exposed portions arranged to face each other and to be exposed in the cavity;

external electrodes provided on a surface of the insulating substrate and connected to the at least one pair of discharge electrodes; and a conductive material dispersed along at least a portion of an inner circumferential surface of the insulating substrate which includes the cavity between the exposed portions of the at least one pair of discharge electrodes; wherein the conductive material includes an anchor portion having a pointed shape and being embedded in the insulating substrate.

2. The ESD protection device according to claim 1, wherein the conductive material is coated with an insulating material.

3. The ESD protection device according to claim 1, wherein the conductive material has a plate shape or a flake shape.

* * * * *